(12) United States Patent
Gaydorus et al.

(10) Patent No.: US 11,892,992 B2
(45) Date of Patent: Feb. 6, 2024

(54) UNIQUE IDENTIFICATION MANAGEMENT

(71) Applicant: salesforce.com, inc., San Francisco, CA (US)

(72) Inventors: Danielle Elise Gaydorus, Dublin, CA (US); Benjamin Busjaeger, San Carlos, CA (US); Sharath Gilbuena Babu, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/649,475

(22) Filed: Jan. 31, 2022

(65) Prior Publication Data
US 2023/0244647 A1    Aug. 3, 2023

(51) Int. Cl.
| | | |
|---|---|---|
| G06F 16/00 | (2019.01) | |
| G06F 16/22 | (2019.01) | |
| G06F 16/242 | (2019.01) | |
| G06F 16/23 | (2019.01) | |
| G06F 16/21 | (2019.01) | |

(52) U.S. Cl.
CPC ........... G06F 16/22 (2019.01); G06F 16/213 (2019.01); G06F 16/2358 (2019.01); G06F 16/2445 (2019.01)

(58) Field of Classification Search
None
See application file for complete search history.

(56) References Cited

U.S. PATENT DOCUMENTS

| | | | |
|---|---|---|---|
| 7,885,932 B2* | 2/2011 | Kulkarni | G06F 16/22 707/706 |
| 9,483,537 B1* | 11/2016 | Peters | G06F 16/254 |
| 10,282,175 B2 | 5/2019 | Busjaeger | |
| 10,346,354 B2* | 7/2019 | Kushwah | G06F 11/1464 |
| 10,474,562 B2 | 11/2019 | Donaldson et al. | |
| 10,608,961 B2 | 3/2020 | Kwong et al. | |
| 10,719,533 B2 | 7/2020 | Busjaeger et al. | |
| 10,783,186 B2* | 9/2020 | Boles | G06F 16/22 |
| 10,824,589 B2* | 11/2020 | Jain | G06F 11/1469 |
| 10,832,309 B2 | 11/2020 | Busjaeger et al. | |
| 11,126,625 B2 | 9/2021 | Busjaeger et al. | |
| 11,157,466 B2 | 10/2021 | Busjaeger et al. | |
| 11,188,500 B2* | 11/2021 | Kushwah | G06F 16/13 |

(Continued)

*Primary Examiner* — Jean M Corrielus
(74) *Attorney, Agent, or Firm* — Kowert, Hood, Munyon, Rankin & Goetzel, P.C; Catherine L. Gerhardt; Dean M. Munyon

(57) ABSTRACT

Techniques are disclosed relating to implementing synthetic identifiers (IDs) for a non-relational database. A server system may operate a database, which includes receiving requests to access records of the database using synthetic IDs. But the database may be searchable using natural IDs. The server system may receive a request to insert a record. In response, the server system may obtain, from a first instance of multiple ID generator instances that implement a distributed ID generator service, a synthetic ID generated based on an identifier assigned to the first ID generator instance. The server system may insert the record with the synthetic ID and a natural ID that corresponds to one or more values of the record. The server system may cause the synthetic ID and the natural ID to be stored in an index of the database to enable the record to be accessed via the synthetic ID.

20 Claims, 11 Drawing Sheets

(56) References Cited

U.S. PATENT DOCUMENTS

| | | | | |
|---|---|---|---|---|
| 2004/0225664 A1* | 11/2004 | Casement | ............... | G06F 16/25 |
| 2008/0104149 A1* | 5/2008 | Vishniac | ................. | G06F 16/22 |
| 2009/0287986 A1* | 11/2009 | Vishniac | ................. | G06F 16/10 |
| | | | | 707/999.2 |
| 2010/0169274 A1* | 7/2010 | Kulkarni | ................. | G06F 16/22 |
| | | | | 711/216 |
| 2011/0196844 A1* | 8/2011 | Kulkarni | ................. | G06F 16/22 |
| | | | | 707/687 |
| 2012/0197994 A1* | 8/2012 | Beerbower | ............. | G06F 9/466 |
| | | | | 709/204 |
| 2012/0271862 A1* | 10/2012 | Kulkarni | ................. | G06F 16/22 |
| | | | | 707/802 |
| 2013/0013606 A1* | 1/2013 | Stanfill | ................. | G06F 16/213 |
| | | | | 707/E17.002 |
| 2014/0025685 A1* | 1/2014 | Kulkarni | ................. | G06F 16/22 |
| | | | | 707/741 |
| 2017/0308606 A1* | 10/2017 | Jonsson | ................. | G06F 16/258 |
| 2018/0121453 A1* | 5/2018 | Jain | ..................... | G06F 11/1464 |
| 2018/0121454 A1* | 5/2018 | Kushwah | ............... | H04L 67/568 |
| 2018/0210713 A1 | 7/2018 | Busjaeger | | |
| 2019/0114348 A1* | 4/2019 | Gao | ....................... | G06F 16/334 |
| 2019/0220917 A1* | 7/2019 | Busjaeger | .......... | G06Q 30/0633 |
| 2019/0294586 A1* | 9/2019 | Kushwah | ................ | G06F 16/13 |
| 2020/0097893 A1 | 3/2020 | Acharya et al. | | |
| 2020/0250172 A1* | 8/2020 | Busjaeger | ......... | G06F 16/24552 |
| 2020/0250210 A1* | 8/2020 | Busjaeger | ............ | G06F 16/328 |
| 2021/0004353 A1* | 1/2021 | Jain | ......................... | G06F 16/13 |
| 2021/0099301 A1 | 4/2021 | Busjaeger et al. | | |
| 2021/0390105 A1 | 12/2021 | Busjaeger et al. | | |
| 2022/0027408 A1* | 1/2022 | Serebrennikov | ....... | G06N 3/006 |
| 2022/0083505 A1* | 3/2022 | Kushwah | .............. | H04L 67/568 |
| 2023/0244647 A1* | 8/2023 | Gaydorus | ............ | G06F 16/213 |
| | | | | 707/736 |

* cited by examiner

UNIQUE IDENTIFICATION MANAGEMENT

BACKGROUND

Technical Field

This disclosure relates generally to a database system and, more specifically, to various mechanisms for implementing synthetic identifiers (IDs) for a non-relational database.

Description of the Related Art

Enterprises routinely implement database management systems (or, simply "database systems") that enable users to store a collection of information in an organized manner that can be efficiently accessed and manipulated. In some cases, a database system implements a key-value database that stores information as a collection of key-value pairs, in which a key serves as a unique identifier for accessing its associated value. During operation, the database system receives requests from users via applications or from other systems, such as another database system, to perform transactions on the information that is stored in the key-value database. The database system uses keys that are specified in those requests to read information out from the key-value database and/or write information back to the key-value database.

DETAILED DESCRIPTION

Figure 1:
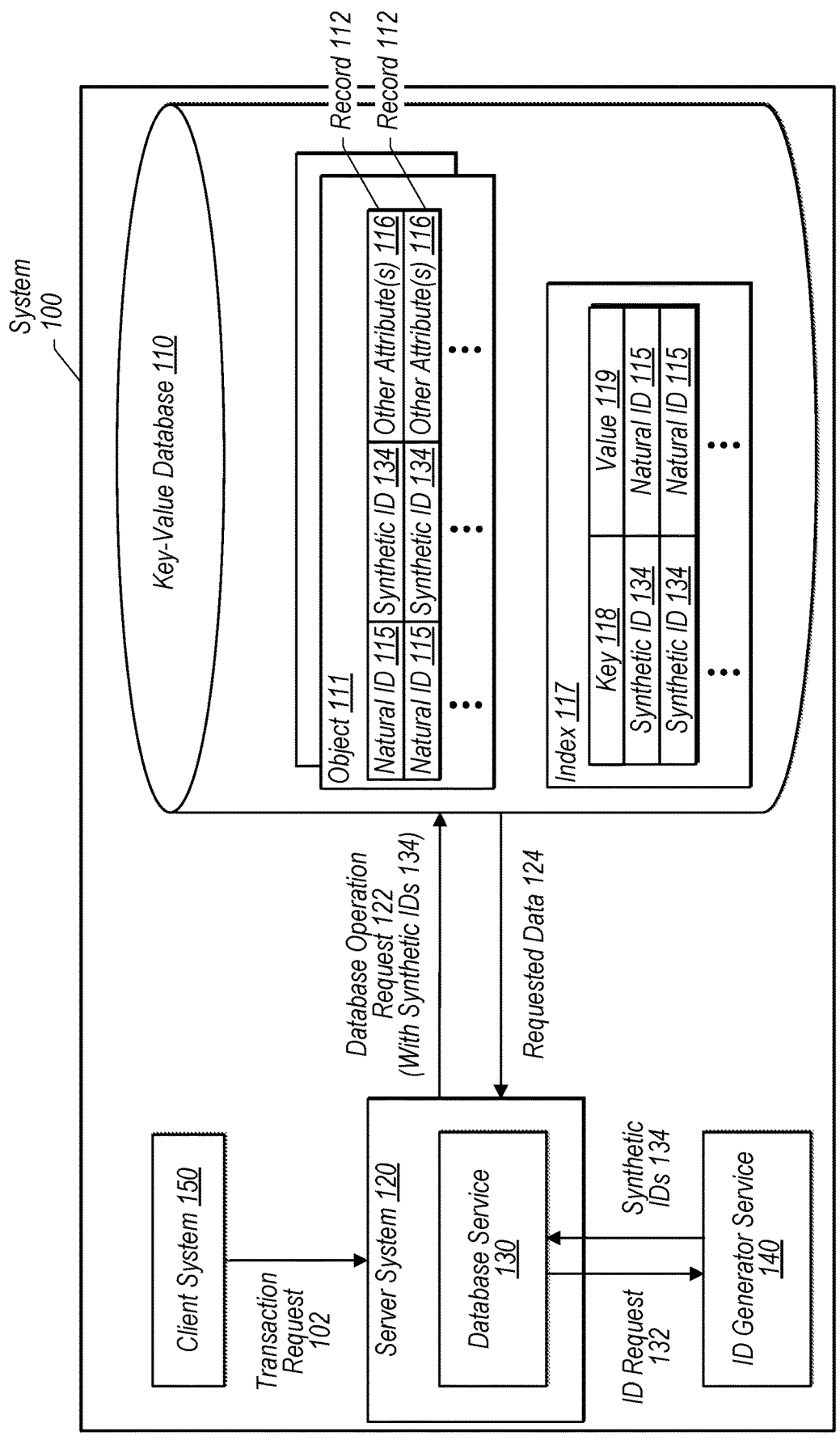
FIG. 1 is a block diagram illustrating example elements of a system capable of storing records in a key-value database that have synthetic IDs, according to some embodiments.

A database system may implement a key-value database that stores data as a collection of records comprising key-value pairs, where a record can be accessed using its key. The key typically corresponds to one or more of the values of the record. Consider an example of a student record that includes a student identifier, a first name, a last name, and an email address. In this example, the key might correspond to the student identifier and thus the record can be accessed using that student identifier. A key that comprises one or more values of a record that together uniquely identify the record is referred to herein as the "natural" key of the record. A key-value database can be organized around natural keys such that record accesses are optimized for the natural keys.

But in some cases, the client systems that interact with relational databases are designed to utilize synthetic keys to access records. As used herein, a "synthetic" key refers to a system-generated key that is included within a record and is used to access the record but does not correspond to user-provided values of the record (e.g., first name, email address, etc.). For example, for a relational database, a synthetic key may be a row identifier that identifies the row occupied by the record in an associated table. One benefit of synthetic keys over natural keys is that synthetic keys are of a fixed length and type, making it simple to pass this type of key between different software layers, while natural keys can be multi-propertied and multi-typed values making them harder to pass between software layers of strongly-typed systems. Relational databases, however, come with scale limitations for certain high request volume scenarios such as business-to-consumer online transaction processing (B2C OLTP). Consequently, it may be desirable to utilize a non-relational database (e.g., a key-value database) instead of a relational database as the non-relational database does not suffer from the same scale limitations for B2C OLTP. But non-relational databases are not designed for handling synthetic keys. As a result, the client systems that are designed to use synthetic keys cannot properly interact with the non-relational database. This present disclosure addresses, among other things, the problem of how to bridge the gap between a client system that uses synthetic keys and a non-relational database that is optimized for natural keys.

In various embodiments that are described below, a system includes a server system, a client system, a key generator service, and a database that is searchable using natural keys. The server system manages the database, which includes receiving requests from the client system to access records of the database using synthetic keys. The terms "synthetic key" and "natural key" are used interchangeably with the terms "synthetic ID" and "natural ID," respectively. To process those requests that use synthetic keys, in various embodiments, an index is maintained that maps between synthetic keys and natural keys. When the server system receives a request to insert a record into the database, the server system may issue a request to the key generator service to generate a unique synthetic key. After obtaining the unique synthetic key, the server system inserts, into the database, the record having the synthetic key and a natural key corresponding to one or more values of that record. The server system updates the index to store a mapping between the synthetic key and the natural key. Accordingly, in response to receiving a request to access the record using the synthetic key, the server system may use the mapping of the index to obtain the natural key and then search the database using the natural key to obtain the record, as the database is optimized for natural key searches in various embodiments. A synthetic key may thus serve as an alias to a natural key.

In order to enable reliable and efficient access to synthetic keys for inclusion in records, in various embodiments, the key generator service is a distributed service comprising multiple key generator instances capable of producing synthetic keys. When a key generator instance is unavailable, another one may be instantiated, or the server system may reach out to a different key generator instance. In order to ensure uniqueness of synthetic keys across the key generator instances, in various embodiments, a key generator instance generates synthetic keys such that a portion of those synthetic keys includes a generator key that was assigned to the key generator instance. In further embodiments that are discussed below, records can be linked together (e.g., a parent-child relationship) via synthetic keys. A record may be inserted in the database without the synthetic key of a corresponding child/parent record and then an asynchronous process may later update the inserted record to include that synthetic key.

These techniques may be advantageous over conventional approaches as they allow for a scalable non-relational database to be implemented for high request volume scenarios while also enabling client systems that use synthetic keys to be able to interact with the non-relational database. As a result, an existing client system that interacts with a relational database through synthetic keys can also interact with a non-relational database with little modification to that client system. These techniques also enable high-volume synthetic key generation through a distributed key generator service comprising multiple generator instances. These techniques further allow for the insertion of child records without taking performance hits by delaying the population of the child records with the synthetic keys of parent records until after the insertion of the child records. Further, these techniques allow for the insertion of a given child record prior to a corresponding parent record being inserted (i.e., prior to the parent record existing). An exemplary application of the techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a key-value database (or store) 110, a server system 120, an ID generator service 140, and a client system 150. Also as shown, key-value database 110 includes objects 111 (with records 112) and an index 117 (with keys 118 and values 119), and server system 120 includes a database service 130. In some embodiments, system 100 is implemented differently than shown. For example, multiple server systems 120 may interact with key-value database 110 and ID generator service 140, multiple client systems 150 may interact with server system 120, ID generator service 140 may be executed by server system 120 instead of being separate from server system 120, key-value database 110 may be a document database, system 100 may also include a relational database, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide web pages and other data to users, databases (e.g., key-value database 110), and entities (e.g., a third-party system) relating to system 100. In various embodiments, system 100 is implemented using cloud infrastructure provided by a cloud provider. Key-value database 110, server system 120, ID generator service 140, and/or client system 150 may thus execute on and utilize the available cloud resources of the cloud infrastructure (e.g., computing resources, storage resources, network resources, etc.) to facilitate their operation. For example, database service 130 may execute within a virtual environment that is hosted on server-based hardware included within a datacenter of the cloud provider. But in some embodiments, system 100 is implemented utilizing a local or private infrastructure as opposed to a public cloud.

Key-value database 110, in various embodiments, includes a collection of information stored as key-value pairs that are organized in a manner that allows for access, storage, and/or manipulation of the key-value pairs. Key-value database 110 may include supporting software (e.g., storage nodes) that enable server system 120 to carry out the operations (e.g., accessing, storing, etc.) on information stored at key-value database 110. In various embodiments, key-value database 110 is implemented using a single or multiple storage devices that are connected together on a network (e.g., a storage attached network (SAN)) and configured to redundantly store information in order to prevent data loss. The storage devices may store data persistently and thus key-value database 110 may serve as a persistent storage for system 100. In various embodiments, key-value database 110 is distributed across different geographical regions (e.g., United States and Europe) in which one or more server systems 120 interact with the instance of key-value database 110 in a given region. The data that is written to key-value database 110 by server system 120 can be accessible to other server systems 120 within a multi-server-system configuration.

In various embodiments, a portion of the data of key-value database 110 is stored within records 112 that are grouped into objects 111 structured according to one or more schemas. In the context of key-value database 110, a record 112 is a key-value pair comprising a set of values, a portion of which can be used as a key to look up that record 112. A natural ID 115, in various embodiments, is a key comprising one or more values of a record's data that together uniquely identify the associated record 112. For example, an object 111 may include a student identifier attribute/field whose values serve as the natural ID 115 for that object. Thus, for a record 112 belonging to that object 111, the record's value for the student identifier attribute can be used to access that record 112. A record 112 can include values for other attributes 116 (e.g., an email address attribute, a data attribute, etc.) and a value that serves as a synthetic ID 134 for the record 112. A synthetic ID 134, in various embodiments, is a system-generated key that is usable to access a record 112. Example records 112 with different values under the same attributes are discussed with respect to FIG. 3 below. An object 111, in various embodiments, is a data structure that groups and structures a set of records 112 according to a schema. For example, an object 111 may represent students and thus be used to group student records 112. In some embodiments, system 100 implements a relational database and thus objects 111 may be database tables. Consequently, a record 112 may correspond to a row in a table and specify values for one or more attributes of that table. While a key-value database is discussed, system 100 may implement other non-relational databases, such as a wide-column database, a document database, etc., and, therefore, records 112 and object 111 may correspond to the appropriate equivalents in those databases.

Index 117, in various embodiments, is a key-value index whose entries can store values 119 for keys 118. In the illustrated embodiment, values 119 correspond to natural IDs 115 and keys 118 correspond to synthetic IDs 134. When searching for a record 112 using a synthetic ID 134, server system 120 may use index 117 to determine the natural ID 115 by accessing the corresponding entry using that synthetic ID 134. After that natural ID 115 has been obtained, server system 120 may access the requested record 112. Accordingly, client system 150 is able to utilize synthetic IDs 134 to query key-value database 110 instead of having to sacrifice those synthetic IDs 134 as a partition key. In some embodiments, index 117 is populated in response to the insertion of records 112 into key-value database 110 and evictions occur in response to the deletion of records 112.

Server system 120, in various embodiments, provides various database services, such as data storage, data retrieval, and data manipulation. Server system 120 may be a combination of hardware and software (e.g., database service 130) executed on that hardware. In various embodiments, database service 130 is an application that is executable to provide the database services of server system 120 to components in system 100 and/or external to system 100. For example, server system 120 can receive a transaction request 102 from client system 150 (e.g., an application server, a user device, another database node, etc.) to perform a transaction. A database transaction, in various embodiments, is a logical unit of work (e.g., a specified set of operations) to be performed in relation to key-value database 110. For example, processing a database transaction may include executing a query statement to retrieve a set of records 112 from an object 111. During operation, database service 130 may receive a transaction request 102 to write a key-value pair, in the form of a record 112, to an object 111 that is stored at key-value database 110. Before writing the record 112, in various embodiments, server system 120 obtains, from ID generator service 140, a synthetic ID 134 to be included in the record 112 and index 117. Accordingly, server system 120 may issue an ID request 132 to ID generator service 140 for the synthetic ID 134.

ID generator service 140, in various embodiments, comprises one or more ID generator instances that can generate synthetic IDs 134. ID generator service 140 may be a service hosted separately from database service 130 (and server system 120) and deployed globally. In some embodiments, each region that executes an instance of database service 130 may also execute an ID generator instance. Both instances may reside within the same trust domain, so that they can communicate with each other. In some embodiments, multiple instances of database service 130 within the same region can share an ID generator instance. That ID generator instance may implement consistency mechanisms to ensure that corruption does not occur in the generation of synthetic IDs 134. For example, the ID generator instance may receive ID requests 132 from separate instances of database service 130 that trigger the execution of separate processes. The ID generator instance may ensure (e.g., by blocking one of those processes, killing one of them, etc.) that those processes are not able to reserve the same batch of synthetic IDs 134.

In response to receiving an ID request 132 from server system 120, ID generator service 140 generates a set of synthetic IDs 134. In various embodiments, a synthetic ID 134 is a fixed-length value (e.g., 15 characters) comprising a set of portions corresponding to different pieces of information. For example, a synthetic ID 134 may include a first portion identifying a type of the record 112 (e.g., an account record), a tenant, or a combination thereof. Accordingly, an ID request 132 may specify the type of the appropriate record 112 and/or the tenant associated with that record 112. A second portion may be reserved for future uses. A third portion may be a generator ID assigned to the ID generator instance that is generating the synthetic ID 134. In particular, each ID generator instance may be assigned its own server identifier which gives it a unique namespace for generated synthetic IDs 134. This may allow the server system to switch between ID generator instances in case one fails or tenants of server system 120 are migrated to a different region without risking having duplicate synthetic IDs 134 generated. As a result, synthetic IDs 134 may be guaranteed to be unique across system 100. A fourth portion may be a value derived from a counter that is managed by the ID generator instance. After generating synthetic IDs 134, the ID generator instance may increment that counter based on the number of synthetic IDs 134 generated. In some embodiments, an ID generator instance maintains a counter for each record type, for each tenant, or for each record type under a tenant. Together the various portions of a synthetic ID 134 may provide useful metadata about a record 112 that enables components of system 100 (e.g., client system 150) to process the record 112 in a more efficient manner.

ID generator service 140 may generate a single synthetic ID 134 or a batch of synthetic IDs 134 (e.g., 100 synthetic IDs 134) depending on the received ID request 132. In particular, due to the rate at which records 112 may be inserted, it may be too resource intensive to issue a separate ID request 132 for each record 112. Thus, in some embodiments, server system 120 issues an ID request 132 for a batch of synthetic IDs 134 and then uses synthetic IDs 134 from the batch for subsequent records 112 without issuing ID requests 132 for those records 112. In various embodiments, server system 120 reserves a batch of synthetic IDs 134 (e.g., by issuing an ID request 132) and then generates the batch of synthetic IDs 134 locally. The ID generator instance 140 may reserve the batch of synthetic IDs 134 for server system 120 by incrementing the relevant counter by the number of synthetic IDs 134 included in the batch.

After receiving a set of synthetic IDs 134 from ID generator service 140, server system 120 may include a synthetic ID 134 in the correct record 112 and issue a database operation request 122 to key-value database 110 to insert the record 112. In response to that request 122 or another database operation request 122, index 117 may be updated to include the natural ID 115 and the synthetic ID 134 of that record 112. Server system 120 may then issue a database operation request 122 to read out the record 112 as requested data 124.

Figure 2:
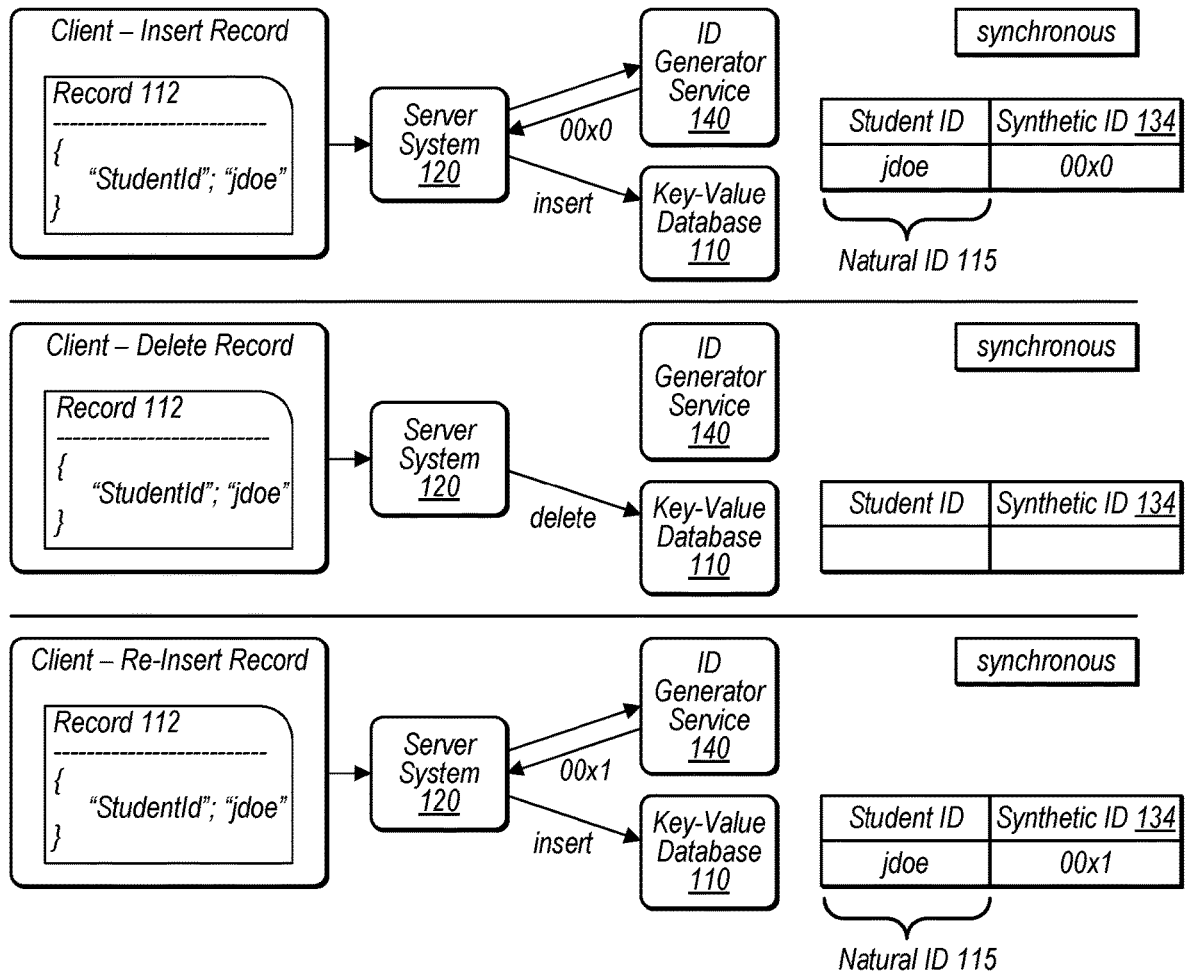
FIG. 2 is a block diagram illustrating the insertion, removal, and reinsertion of a record into a key-value database, according to some embodiments.

Turning now to FIG. 2, a block diagram of the insertion, removal, and then reinsertion of a record 112 is shown. For the initial insertion of the record 112, server system 120 obtains a synthetic ID 134 ("00x0") from an ID generator instance of ID generator service 140. In disclosed embodiments, example synthetic IDs may be referred to with four characters. In various embodiments, synthetic IDs include any of various numbers of characters (e.g., a synthetic ID may include 15 characters). Server system 120 includes the synthetic ID 134 in the record 112 and then writes that record 112 into key-value database 110 (e.g., via a database operation request 122). As shown, the record 112 includes a natural ID 115 ("jdoe") and the synthetic ID 134 ("00x0"). At a later point in time, server system 120 issues a database operation request 122 to key-value database 110 to delete the record 112. In various embodiments, for each insertion of a given record 112, server system 120 obtains a synthetic ID 134 for the given record 112. Consequently, for a reinsertion of the illustrated record, server system 120 obtains a different synthetic ID 134 ("00x1") from the ID generator instance. Server system 120 includes the synthetic ID 134 in the record 112 and then writes that record 112 back into key-value database 110 again. During the insertion, removal, and reinsertion of the record 112, server system 120 may update index 117 to store the relevant mapping for that record 112 while it is stored at key-value database 110.

Figure 3:
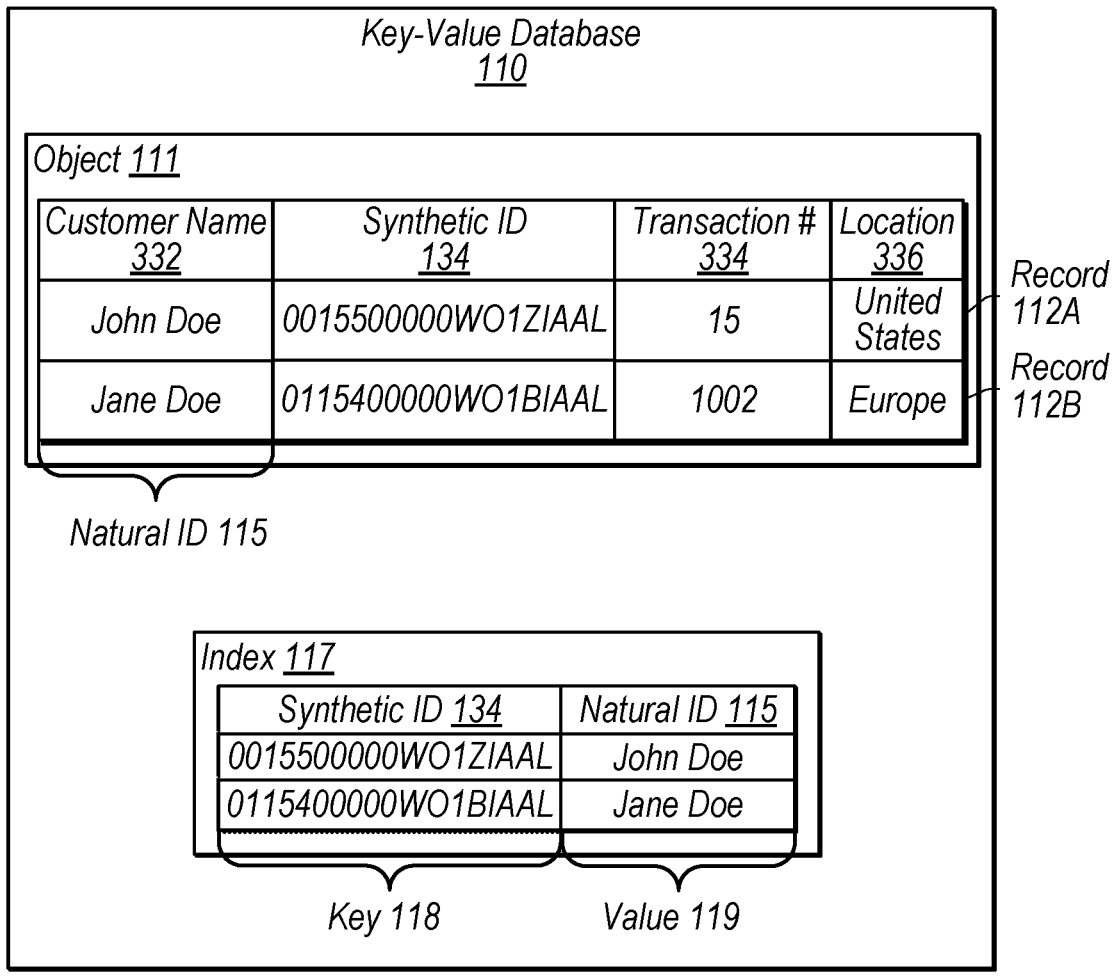
FIG. 3 is a block diagram illustrating example elements stored in a key-value database, according to some embodiments.

Turning now to FIG. 3, a block diagram of an example key-value database 110 is shown. In the illustrated embodiment, key-value database 110 comprises an object 111 having records 112A-B and an index 117. Also as shown, record 112A includes a natural ID 115 ("John Doe") corresponding to the value of a customer name attribute 332 included within record 112A. Likewise, record 112B also includes a natural ID 115 ("Jane Doe") corresponding to the value of customer name attribute 332 for record 112B. As further shown, records 112A-B include values for a transaction number attribute 334 and a location attribute 336. These values, however, are not used to define the natural IDs 115 of records 112 within the illustrated embodiment. Records 112A-B also include synthetic IDs 134 ("0015500000WO1ZIAAL" and "0115400000WO1BIAAL," respectively). These natural IDs 115 and synthetic IDs 134 are included in index 117 such that, given a synthetic ID 134, a corresponding natural ID 115 can be accessed from index 117. Thus, in response to receiving a transaction request 102 to return a record for "0015500000WO1ZIAAL," server system 120 may obtain "John Doe" from index 117 and then use "John Doe" to access record 112A from object 111 so that it can be returned to the requestor.

Figure 4A:
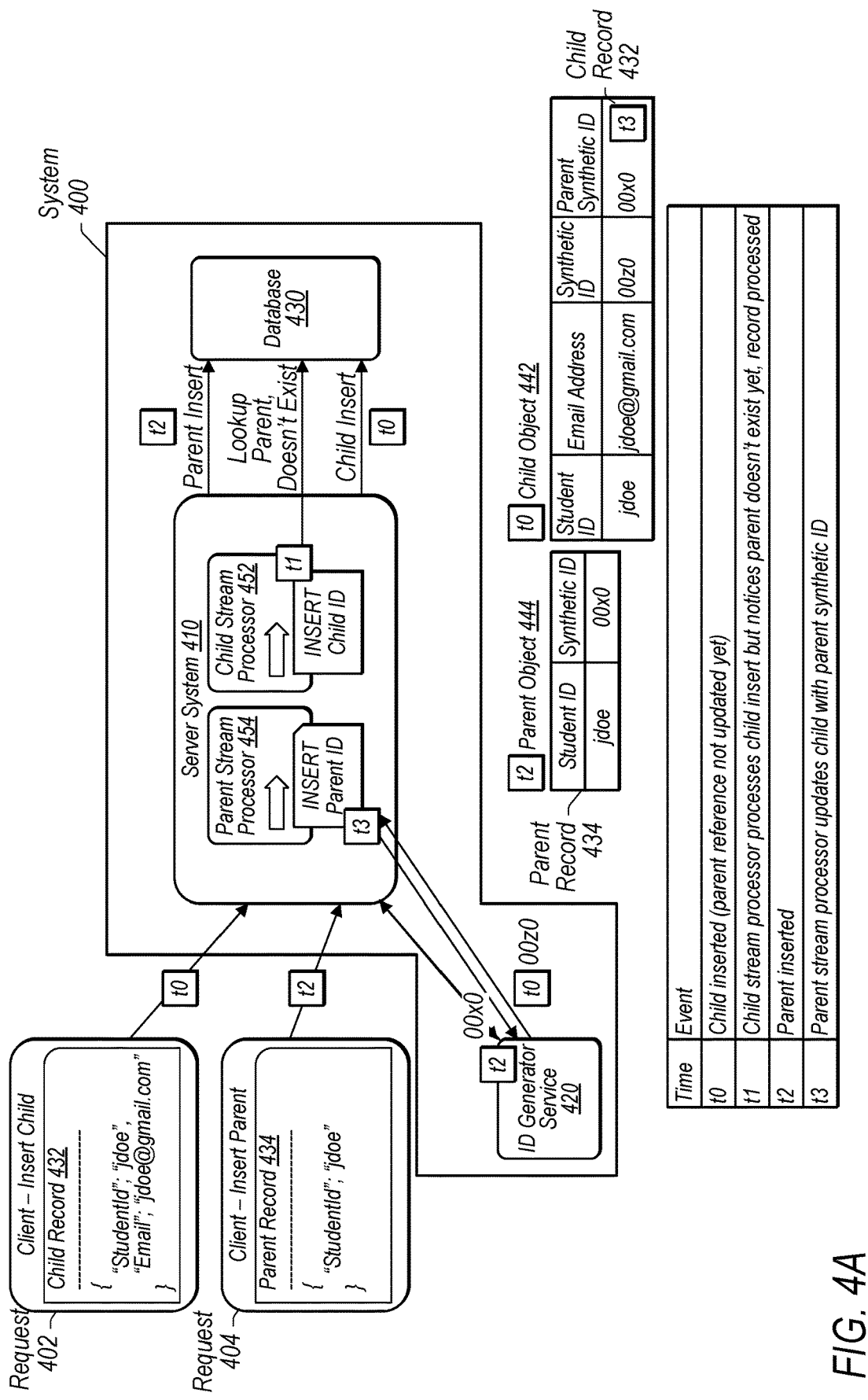
FIG. 4A is a block diagram illustrating example synthetic ID assignment for a child record being inserted into an object in the database prior to a corresponding parent record, according to some embodiments.

Turning now to FIGS. 4A-6, block diagrams illustrating example synthetic ID assignment for database records including referential relationships are shown. For example, two database objects (e.g., tables) may be interleaved, such that a record in a first database object is a child record of another record in the second database object (e.g., a child record includes a reference field to a parent record). Note that the examples discussed below with reference to FIGS. 4A and 4B illustrate a set of two database operations (i.e., INSERT operations), but requested in different orders to provide contrast for how synthetic ID assignment for interleaved database objects is implemented. Various examples discussed below with reference to FIGS. 4A-6 may include multiple asynchronous stream processors processing at the same or different times. These examples illustrate execution of the disclosed techniques to maintain eventual consistency within a database when multiple asynchronous stream processors fire at similar or the same. The example discussed below with reference to FIG. 4C may occur after either of the examples of FIG. 4A or FIG. 4B. The examples discussed below with reference to FIG. 5 and FIG. 6 may occur independently of one another as well as independently of the examples of FIGS. 4A-4C. The examples discussed below with reference to FIGS. 4A-6 includes references to different times (e.g., "t0", "t1", "t2", etc.). In various embodiments, these times may be milliseconds, seconds, minutes, etc. apart from one another. As one specific example, time t0 could be at 12:22:21 (hour, minute, second), while time t1 could be at 12:22:22.

In various situations, when two or more database records include referential relationships to one another, the database objects corresponding to these records may be referred to as interleaved database objects. In disclosed techniques database records implementing the disclosed object template (e.g., Salesforce object template) may be synchronously assigned a 15-character synthetic ID at creation time. Relationships between parent and child database records are maintained by synchronously assigning both parent and child records their own 15-character unique synthetic ID, but child records asynchronously keep track of (e.g., include) their parent synthetic ID, such that parent records can visualize corresponding child records. To avoid computing costs associated with round trip lookups within a database necessary to maintain the integrity of parent-child record relationships, the IDs of such records are assigned and maintained in an eventually consistent manner using streaming logic. For example, when a record is created, deleted, and recreated via its natural ID, the recreated record is assigned a new synthetic ID, such that child records having relationships with this parent record need to be reassigned to the new parent synthetic ID of the recreated parent record. The disclosed techniques discussed with reference to FIGS. 4A-6 guarantee that child records are eventually consistent. Said another way, the disclosed techniques guarantee that child records eventually include references to the proper parent record via its parent synthetic ID. For example, while synthetic IDs of parent records are synchronously maintained and synthetic IDs of child records are synchronously maintained, references within child records to parent synthetic ID s are maintained in an eventually consistent manner in disclosed techniques.

In the disclosed embodiments, the synthetic ID of a parent database record is mutable and the mapping from the child database record to its parent is eventually consistent. As such, in the disclosed techniques, a child record may be inserted prior to a parent record being inserted into the database. Database records discussed herein are generated by database service 130 (which in the Salesforce.com™ context may be a ZOS application programming interface (API)) and may be referred to as Salesforce objects.

Turning now to FIG. 4A, a block diagram illustrating example synthetic ID assignment for a child record being inserted into a database prior to a corresponding parent record is shown. In the illustrated embodiment, system 400 is one example of system 100 discussed with reference to FIG. 1. System 400 includes a server system 410 (one example of server system 120 shown in FIG. 1), an ID generator service 420 (one example of service 140 shown in FIG. 1), and a database 430 (one example of key-value database 110 shown in FIG. 1). In the illustrated embodiment, when a client system (one example of client system 150 shown in FIG. 1) submits a request 402 to insert a new child record 432 (one example of a record 112 shown in FIG. 1) into child object 442 (one example of an object 111 shown in FIG. 1) in database 430 at time t0, server system 410 obtains a new synthetic ID (one example of a synthetic ID 134 shown in FIG. 1) for child record 432 from ID generator service 420 and inserts child record 432 into child object 442 in database 430 (with the new synthetic ID). At time t0, server system 410 does not yet add the parent synthetic ID reference within child record 432. For example, generation of the synthetic ID is performed synchronously at the time child record 432 is created by server system 410, while the population of the parent synthetic ID field within child record 432 is performed asynchronously.

At time t1, in the illustrated embodiment, a child stream processor 452 runs asynchronously to look up the parent synthetic ID within child record 432 but does not find the parent synthetic ID (because it does not yet exist in the database). At time t2, a client system (which may be the same or a different device than the device that submitted request 402) submits a request 404 to insert a new parent record 434 into parent object 444. In response to this request at time t2, server system 410 obtains a new synthetic ID for parent record 434 from ID generator service 420 and inserts parent record 434 into parent object 444 in database 430. At time t3, server system 410 executes a parent stream processor 454 to update child record 432 in database 430 to include the synthetic ID of parent record 434. For example, parent stream processor 454 will update child record 432, since child stream processor 452 processed before parent record 434 was inserted into database 430.

In various embodiments, queries on database 430 may query child records 432 using the synthetic ID of a parent record 434. As one specific example, a query specifying "Get child records by parent synthetic ID" would provide a user submitting this query with child records 432 that include a reference field with the parent synthetic ID. Further in this specific example, this query may return a set of email records (child records 432) for a given student record (a parent record 434).

Figure 4B:
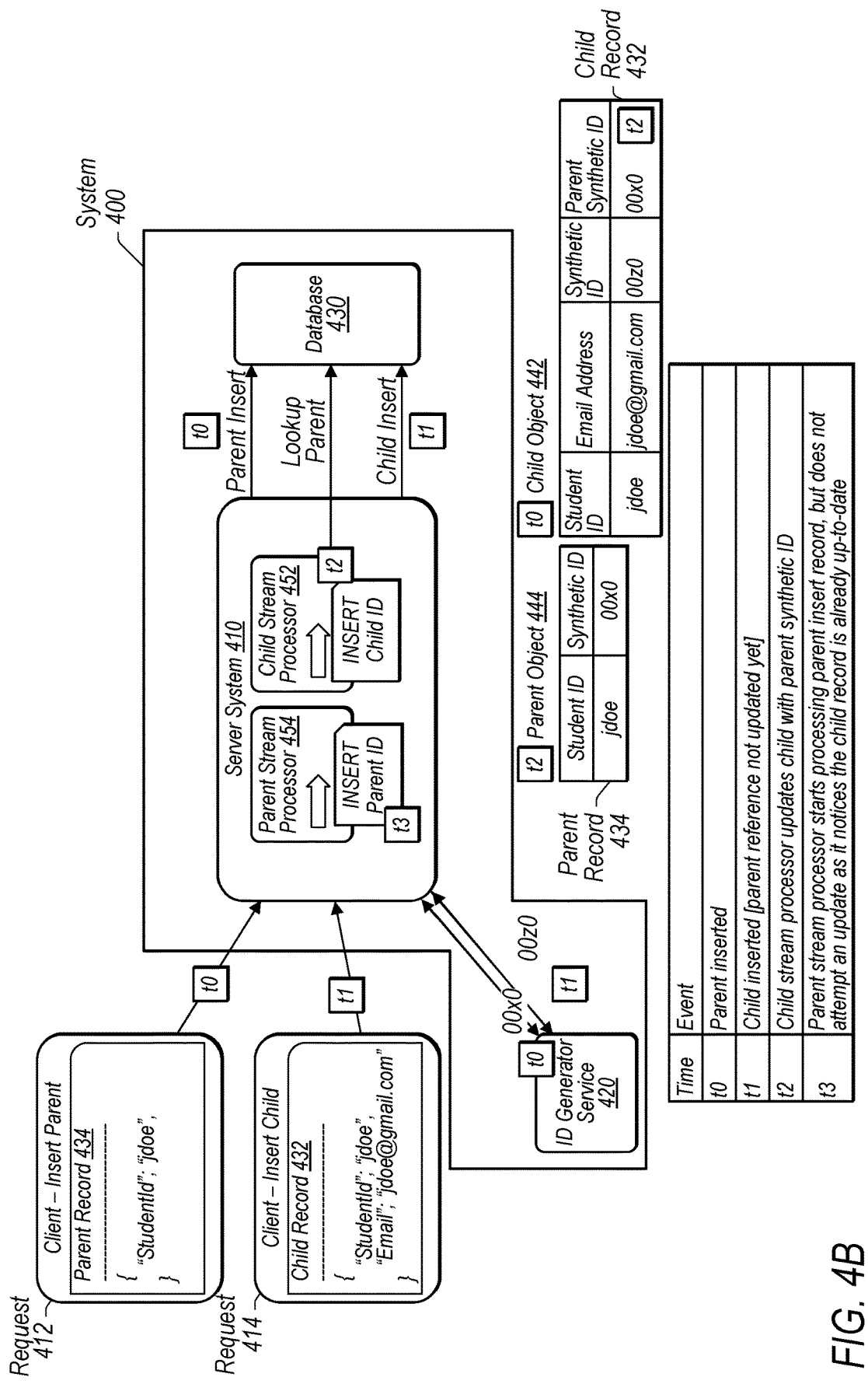
FIG. 4B is a block diagram illustrating example synthetic ID assignment for a parent record in being inserted into an object in the database prior to a corresponding child record, according to some embodiments.

Turning now to FIG. 4B, a block diagram illustrating example synthetic ID assignment for a parent record being inserted into a database prior to a corresponding child record is shown. The example shown in FIG. 4B illustrates the reverse situation to the example illustrated in FIG. 4A. For example, instead of a new child record 432 being inserted before a new parent record 434, a new parent record 434 is inserted first. In the illustrated embodiment, server system 410 receives a request 412 at time t0 from a client system to insert a parent record 434 into parent object 444 in database 430. In response to this request, server system 410 obtains a synthetic ID from ID generator service 420 for parent record 434 and inserts parent record 434 into database 430 with its synthetic ID ("00x0").

In the illustrated embodiment, at time t1 a client system (which may be the same or a different device than the device that submitted request 412) submits a request 414 to insert a new child record 432 into child object 442 in database 430. In response to this request, server system 410 at time t1 obtains a new synthetic ID for child record 432 and inserts child record 432 into database 430 (but does not yet add the field within child record 432 that will include the parent synthetic ID 134).

In the illustrated embodiment, at time t2, server system 410 executes child stream processor 452 to update child record 432 with the parent synthetic identifier ("00x0"). For example, child stream processor 452 adds the parent synthetic identifier ("00x0") to a field included in child record 432 (e.g., adding a reference field with value ("00x0")). At time t3, parent stream processor 454 ignores the parent insert record command since child record 432 has already been updated at time t2 with the parent synthetic ID. For example, while processing the parent insert record process, the parent stream processor determines that the child record's parent synthetic ID value is already up-to-date so the processor does not proceed with making the update. Parent stream processor 454 or child stream processor 452 will update child record 432 based on the time at which the stream records arrive. In this example, the order of events for the child and parent stream processors is independent. For example, if the parent record is inserted first, then the parent synthetic ID exists; however, either the parent stream processor or the child stream processor may update the child record to include the parent's synthetic ID. In the example of FIG. 4B, the events occurring at times t2 and t3 could occur in reverse order independent of the ordering of the events at times t0 and t1.

Figure 4C:
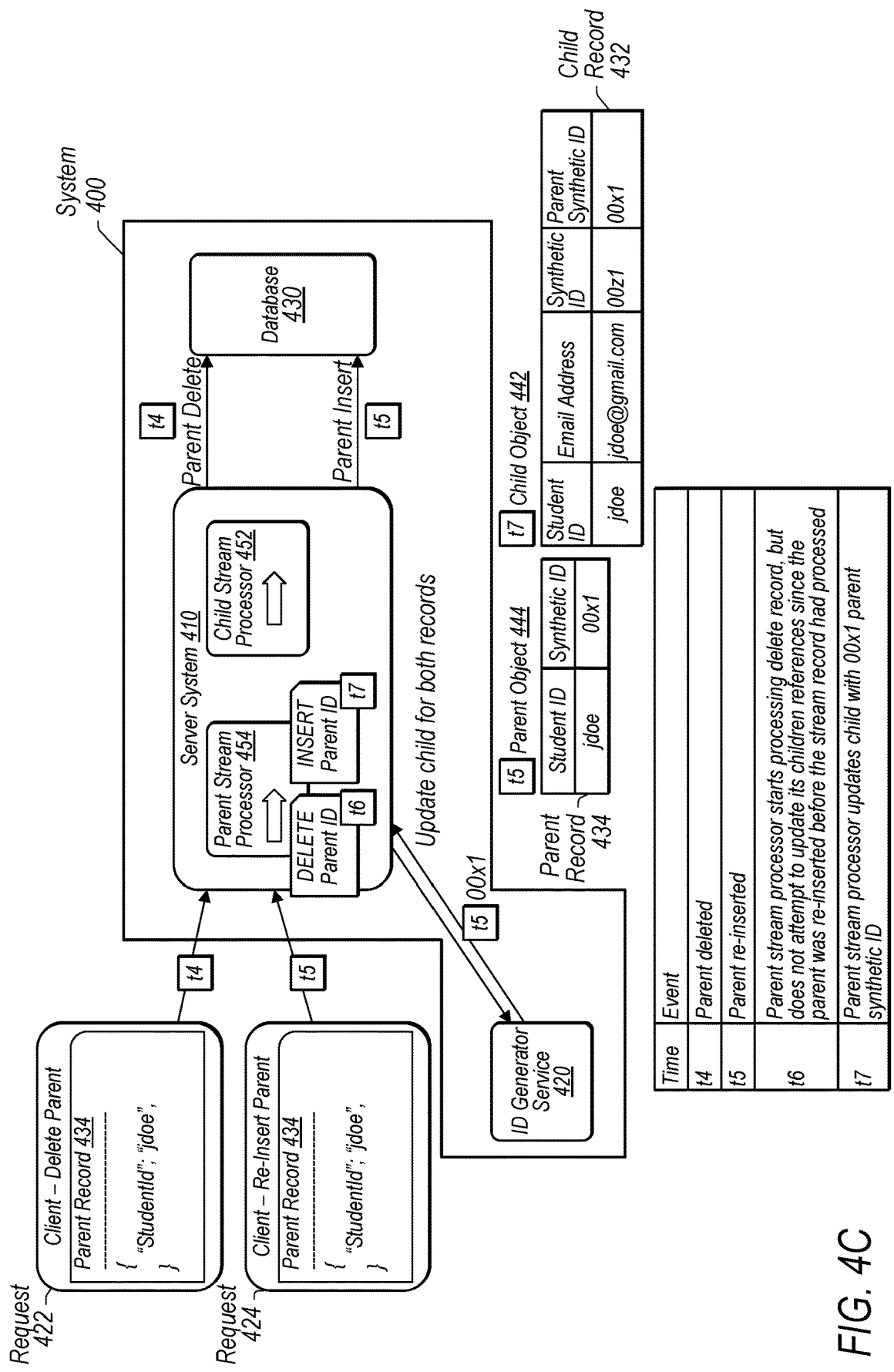
FIG. 4C is a block diagram illustrating example synthetic ID assignment for a parent record being deleted and re-inserted into a database, according to some embodiments.

Turning now to FIG. 4C, a block diagram illustrating example synthetic ID assignment for a parent record being deleted and re-inserted into a database is shown. In the illustrated embodiment, parent record 434 inserted into parent object 444 either in FIG. 4A or 4B is deleted and then reinserted into database 430. As such, in FIG. 4C, the time continues from where FIG. 4B ended at time t3, picking up at time t4. At time t4, in the illustrated embodiment, server system 410 receives a request 422 from a client system to delete parent record 434 and proceeds to delete this record 434 from database 430.

At time t5, in the illustrated embodiment, server system 410 receives a request 424 to re-insert parent record 434 into parent object 444. In response to this request and still at time t5, server system 410 obtains a new synthetic ID ("00x1") for parent record 434 and then server system 410 re-inserts parent record 434 (including its new synthetic ID) into database 430. Note that parent record 434 at time t5 shows student ID ("jdoe") and the newly obtained synthetic ID ("00x1") for the re-inserted parent record. At time t6, parent stream processor 454 process ("DELETE Parent ID") starts processing but does not attempt to update its children since the parent was re-inserted before the stream record had processed. Then, at time t7, parent stream processor 454 updates child record 432 with the new parent synthetic ID ("00x1") for the re-inserted parent record 434. For example, because the re-inserted parent record 434 is assigned a new synthetic ID upon re-insertion, child objects referencing this parent need to be updated to replace their old parent synthetic ID with the new parent synthetic ID. Similar to the example illustrated in FIG. 4B, the example illustrated in FIG. 4C shows that either parent stream processor 454 or child stream processor 452 will update child record 432 based on when the stream records arrive. For example, both database operations requested in FIG. 4C are for parent object 444 and, thus, parent stream processor 454 updates child object 442 with new parent synthetic IDs accordingly.

Figure 5:
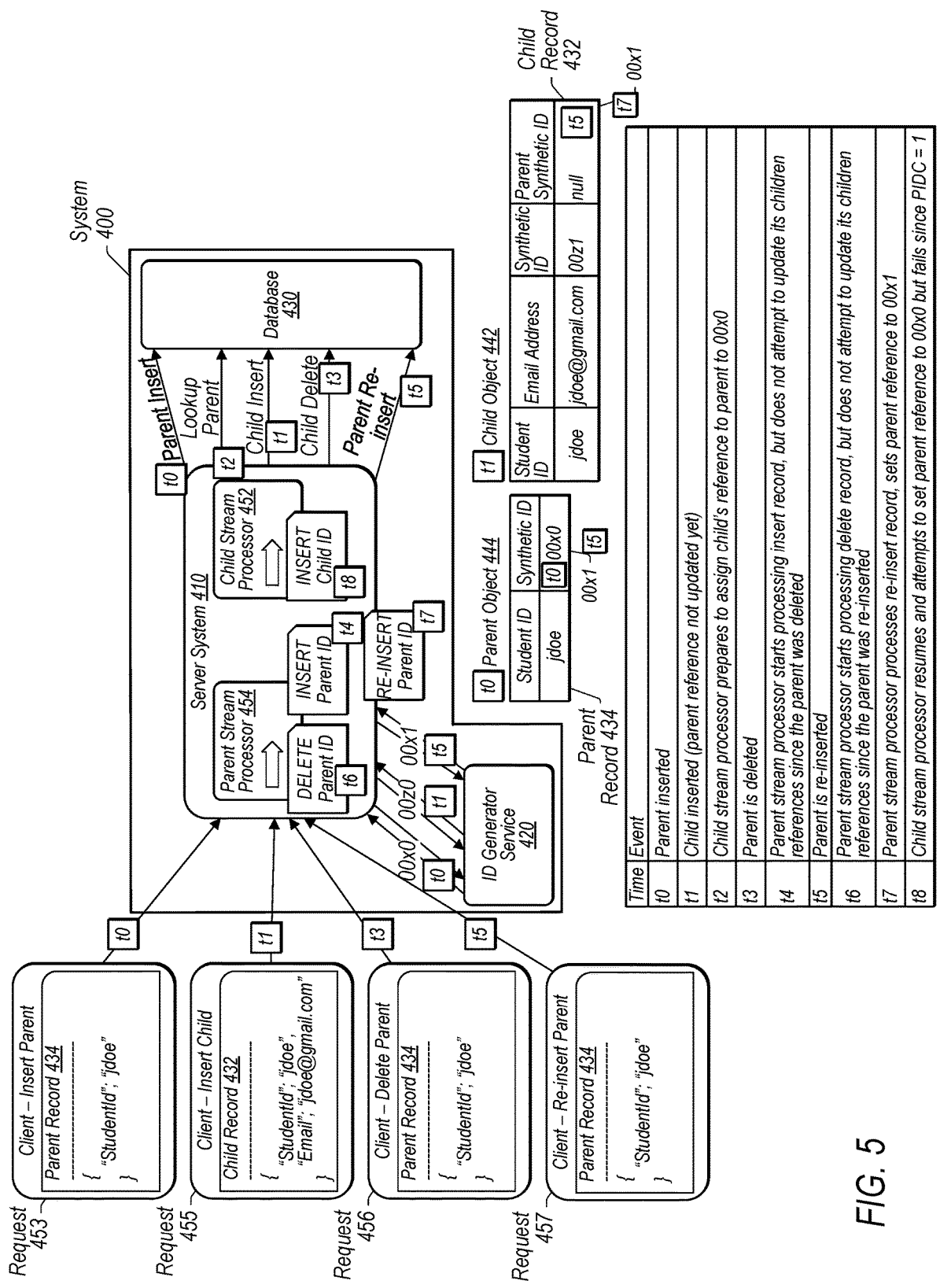
FIG. 5 is a block diagram illustrating an example ID counter for a parent record, according to some embodiments.

Turning now to FIG. 5, a block diagram illustrating an example ID counter for a parent record is shown. In disclosed techniques a parent ID counter (PIDC) is used to manage updating parent synthetic ID references included in child database records amongst three asynchronous jobs: a child stream processor, a parent stream processor, and a scrutiny process. Implementation of the PIDC may advantageously reduce the time to achieve eventual consistency for various records within interleaved database objects. For example, while the disclosed ID assignment is still eventually consistent without implementation of a PIDC, implementation of the PIDC may reduce time to consistency. As used herein, the term "scrutiny" refers to a job that is periodically executed to scan through child records and, in response to determining that such child records are out of date, updating the parent synthetic ID referenced in these child records. Scrutiny is a consistency maintenance process that runs in the background in addition to the PIDC to assist in coordinating asynchronous stream processors.

At time t0, in the illustrated embodiment, server system 410 receives a request 453 from a client system to insert a new record 434 into parent object 444 in database 430. Further at time t0, server system 410 obtains a synthetic ID ("00x0") from ID generator service 420 and inserts parent record 434 into database 430. At time t1, server system 410 receives a request 455 to insert a new child record 432 into child object 442, obtains a synthetic ID ("00z0") from ID generator service 420 for child record 432, and inserts child record 432 into database 430 (although server system 410 does not yet update the reference field included in child record 432 to include the parent synthetic ID).

At time t2, server system 410 executes child stream processor 452 to lookup a parent synthetic ID stored in child record 432 and recognizes that the parent reference field in child record 432 within child object 442 does not exist yet (i.e., the reference field within the child record has not yet been added to reference the parent synthetic ID). Based on this information, child stream processor 452 prepares to assign the child record's reference field to the parent synthetic ID ("00x0"). At time t3, server system 410 receives a request 456 to delete parent record 434 from database 430 and, in response, deletes parent record 434. In this example, however, child records referencing this parent record in the database are not deleted.

At time t4, although server system 410 executes parent stream processor 454 to insert the parent synthetic ID (based on parent record 434 being inserted at time t0), this operation is ignored since parent record 434 was deleted from database 430 at time t3. At time t5, server system 410 receives a request 457 from a client computing device to re-insert the parent record 434 into database 430. In response, at time t5, the server system 410 retrieves a new synthetic ID ("00x1") for this parent record and re-inserts the parent record into database 430.

At time t6, in the illustrated embodiment, the delete record process of parent stream processor 454 does not move forward since the parent record was re-inserted into the database. At time t7, the parent stream processor 454 processes the re-insert record process and sets the parent reference within the child record to ("00x1") based on the newly retrieved parent synthetic ID. Also at time t7, parent stream processor 454 increments the PIDC to indicate that it has updated child record 432. In some embodiments, implementation of the PIDC by server system 410 helps mitigate the risk of stale (old) parent synthetic IDs (from deleted parent records) getting inserted into child record reference fields At time t8, the child stream processor resumes and attempts to set the parent reference in the child record to the old parent synthetic ID of ("00x0"), but fails since the PIDC equals one. The PIDC, in this scenario and based on the sequence of events, helps reduce or prevent inconsistencies in parent synthetic IDs referenced within child records. Because the parent stream processor already made the update to the parent synthetic ID reference within the child record at time t7, execution of parent stream processor 454 to set the parent synthetic ID from child record 432 within database 430 does not move forward at time t8. Such techniques may advantageously avoid redundant execution of child stream processor 452, particularly in situations in which an insert and delete operation for a given database record are received close together.

Figure 6:
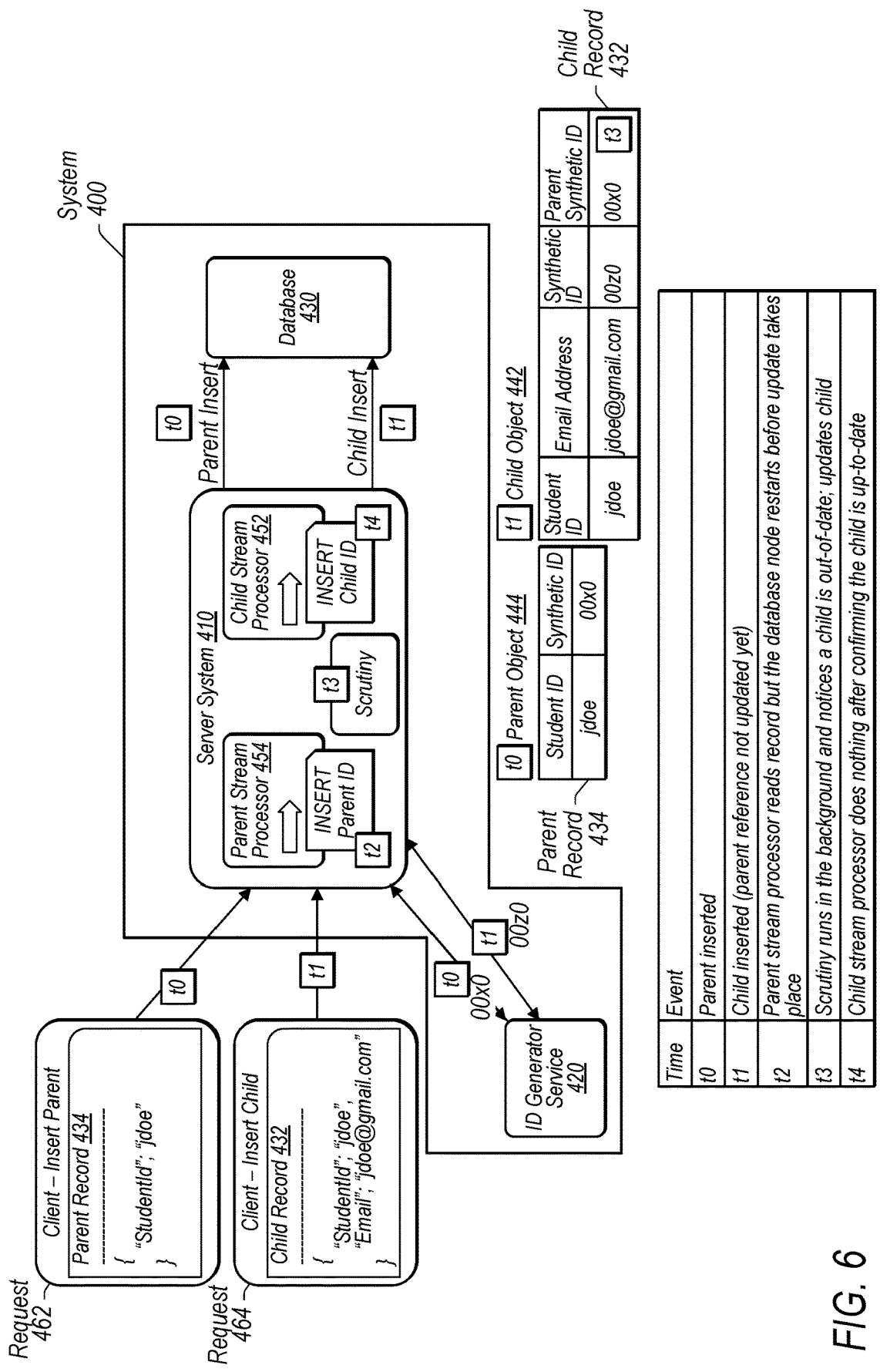
FIG. 6 is a block diagram illustrating example scrutiny updates, according to some embodiments.

Turning now to FIG. 6, a block diagram illustrating example scrutiny updates is shown. In various embodiments, the scrutiny process scans through child database records, attempting to identify child records with incorrectly assigned parent synthetic IDs. If such records are identified, then the scrutiny process increments the PIDC on each updated child record at the time it successfully updates the parent synthetic ID. In various embodiments, the scrutiny process updates based on timings, which may happen following the crash or restart of a server system 120 component (e.g., the crash of a database or a database service crash) while parent stream processor 454 is processing.

At time t0, in the illustrated embodiment, a client system submits a request 462 to insert a parent record 434 into parent object 444 and server system 410 obtains parent synthetic ID ("00x0") from ID generator service 420 and inserts parent record 434 into database 430. At time t1, a client system submits request 464 to insert a child record 432 and server system 410 obtains child synthetic ID ("00z0") from ID generator service 420 and inserts child record 432 into database 430; however, the reference field of this child record 432 does not yet include the parent synthetic ID.

At time t2, parent stream processor 454 attempts to read child record 432 in order to insert the parent synthetic ID ("00x0") into the reference field of child record 432, but the database service node on which the parent stream processor is running restarts before the insert can take place. At time t3, server system 410 executes a scrutiny process in the background and this process notices that child record 432 is out of date (due to the node restart) and updates child record 432 by inserting the parent synthetic ID ("00x0"). At time t4, child stream processor 452 does not execute to insert the parent synthetic ID into child record 432 based on observing that child record 432 is up to date (as a result of the scrutiny process run at t3).

Example Method

Figure 7:
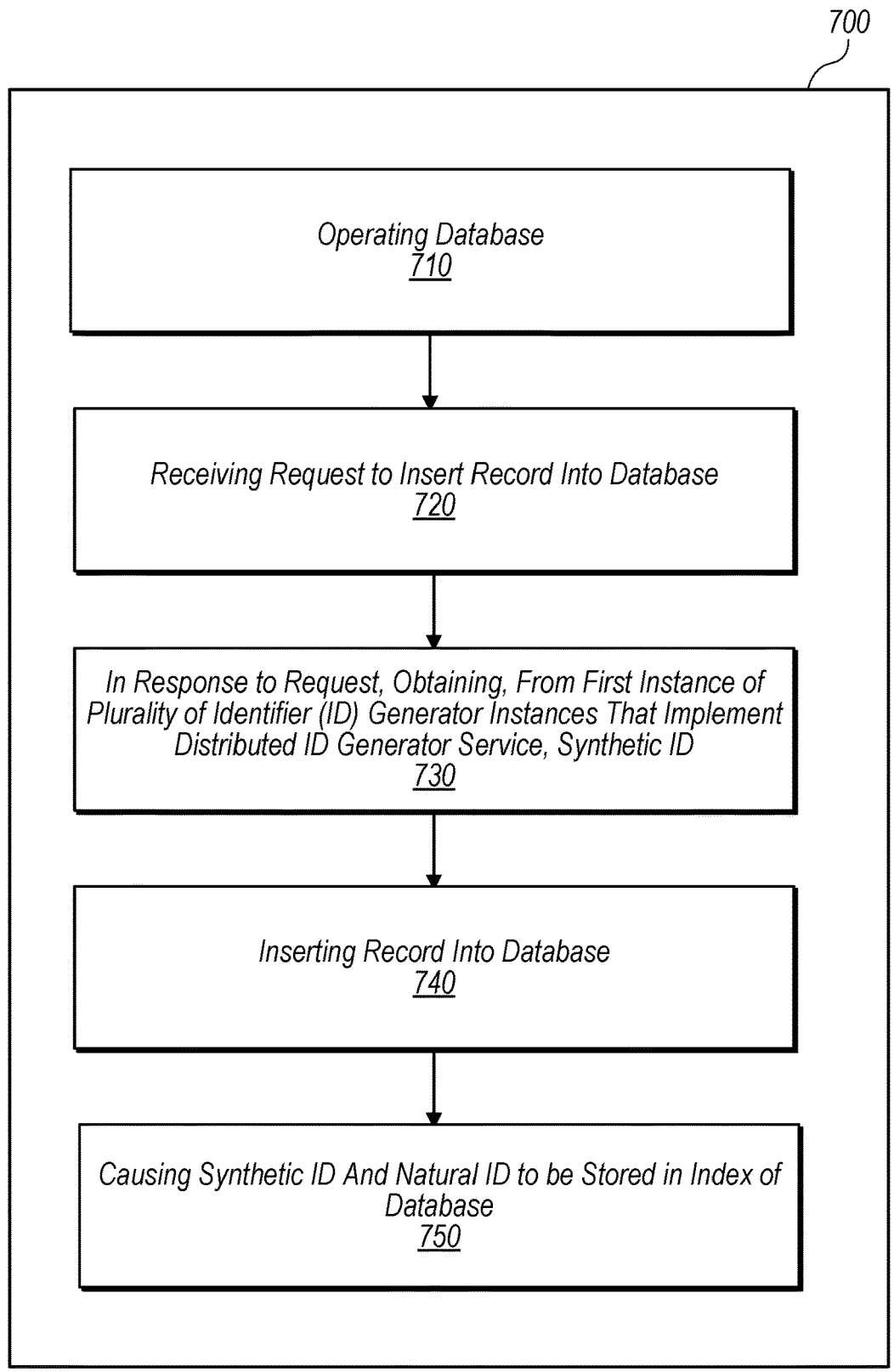
FIG. 7 is a flow diagram illustrating an example method relating to inserting a record into a database, according to some embodiments.

FIG. 7 illustrates an exemplary method for automating authentication decisions for different accounts without user input, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. For example, method 700 may be performed by system 100 or system 400, or both.

Method 700 begins in step 710 with a computer system (e.g., server system 120) operating a database (e.g., key-value database 110), including receiving requests (e.g., transaction requests 102) to access records (e.g., records 112) of the database using synthetic identifiers (e.g., synthetic IDs 134). The database is searchable using natural IDs (e.g., natural IDs 115). The database may be a non-relational database that is operated by a plurality of server systems. In step 720, the server system receives a request to insert a record into the database.

In step 730, in response to the request, the server system obtains, from a first instance of a plurality of identifier (ID) generator instances that implement a distributed ID generator service (e.g., ID generator service 140), a synthetic ID. The synthetic ID may be generated based on an identifier assigned to the first ID generator instance to ensure uniqueness of the synthetic ID across the database. Obtaining the synthetic ID may include the server system providing, to the first ID generator instance, a record type and a tenant ID of a tenant associated with the record. The synthetic ID is unique to records of the record type with respect to the tenant. In some cases, obtaining the synthetic ID includes the server system sending a synthetic ID request (e.g., ID request 132) to the first ID generator instance to generate a batch of synthetic IDs having the synthetic ID. The server system may be operable to insert a set of records using ones of the batch of synthetic IDs without issuing another synthetic ID request to the first ID generator instance. In various embodiments, the synthetic IDs generated by the distributed ID generator service are unique across the plurality of server systems.

In step 740, the server system inserts the record into the database. The record includes the synthetic ID and a natural ID that corresponds to one or more values of the record. The natural ID is identified by a provider of the request to insert the record. In step 750, the server system causes the synthetic ID and the natural ID to be stored in an index (e.g., index 117) of the database. The index may enable the record to be accessed via the synthetic ID. Accordingly, the record is queryable via the synthetic ID and the natural ID. The server system may delete the record from the database and then reinsert the record into the database. The reinserted record may include the natural ID but a different synthetic ID.

In some cases, the record is a child record (e.g., a child record 432) that specifies a natural ID of a parent record (e.g., a parent record 434). After inserting the child record, the server system may access the parent record using the natural ID of the parent record specified by the child record and update the child record to specify the synthetic ID of the parent record. In some cases, the record is a child record inserted before a parent record. Accordingly, after inserting the child record, the server system may insert the parent record into the database and asynchronously update the child record to specify a synthetic ID of the parent record. In some cases, the data record is a child record that includes a natural ID of a parent record and a synthetic ID of the parent record. The server system may delete the parent record from the database and then reinsert the parent record into the database. The server system may first update the child record to specify a null value for the synthetic ID of the parent record and then update the child record to specify the synthetic ID of the parent record. In some embodiments, the child record does not yet include a reference field to a parent record that has not been inserted in the database. In some embodiments, after inserting the parent record, the server system defines a reference field in the child record, wherein the reference field includes a synthetic ID of the parent record.

Exemplary Multi-Tenant Database System

Figure 8:
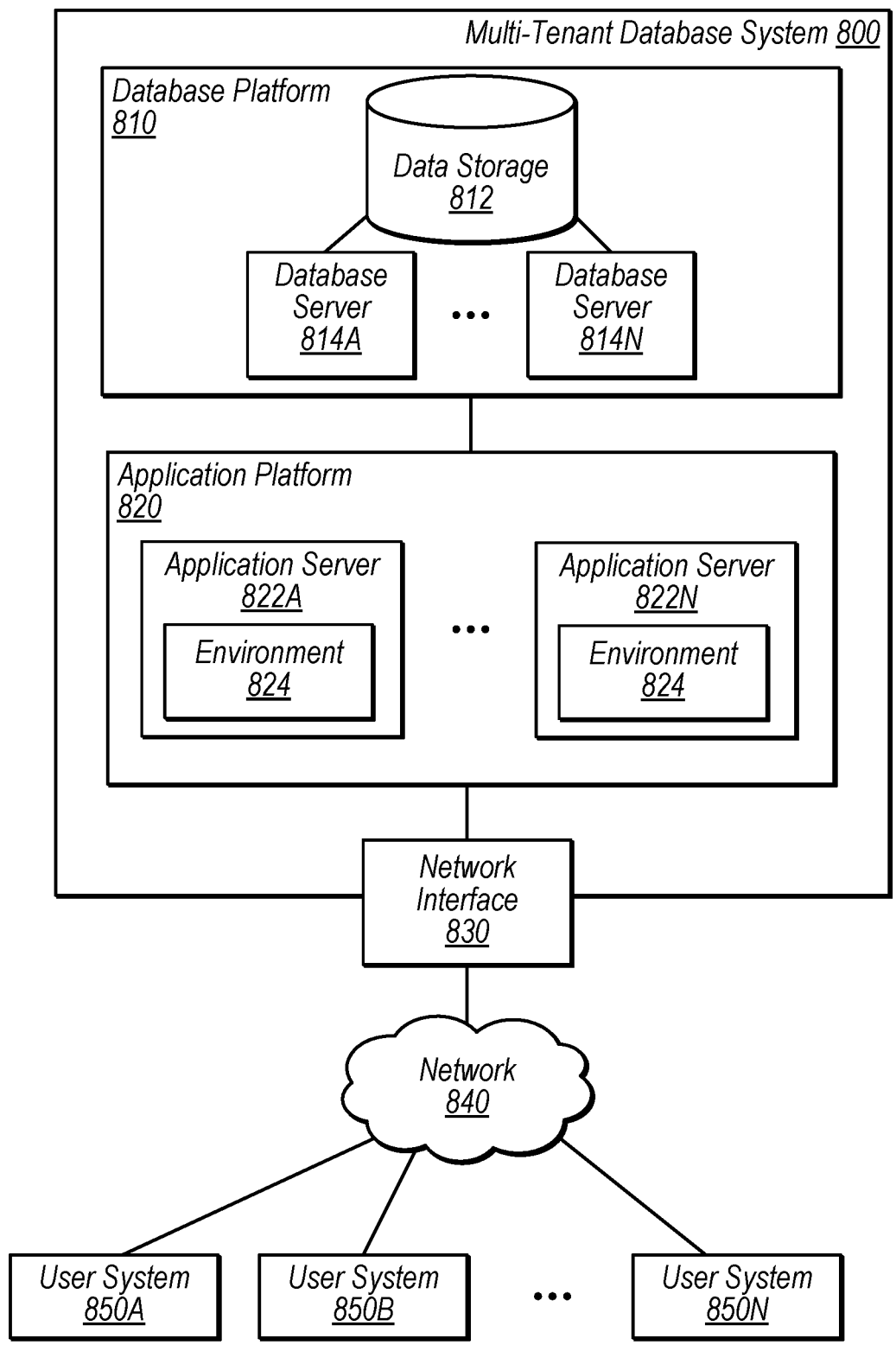
FIG. 8 is a block diagram illustrating elements of a multi-tenant system corresponding to the system described in the present disclosure, according to some embodiments.

Turning now to FIG. 8, an exemplary multi-tenant database system (MTS) 800 in which various techniques of the present disclosure can be implemented is shown—e.g., system 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database nodes) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records (e.g., records 112) having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object-oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
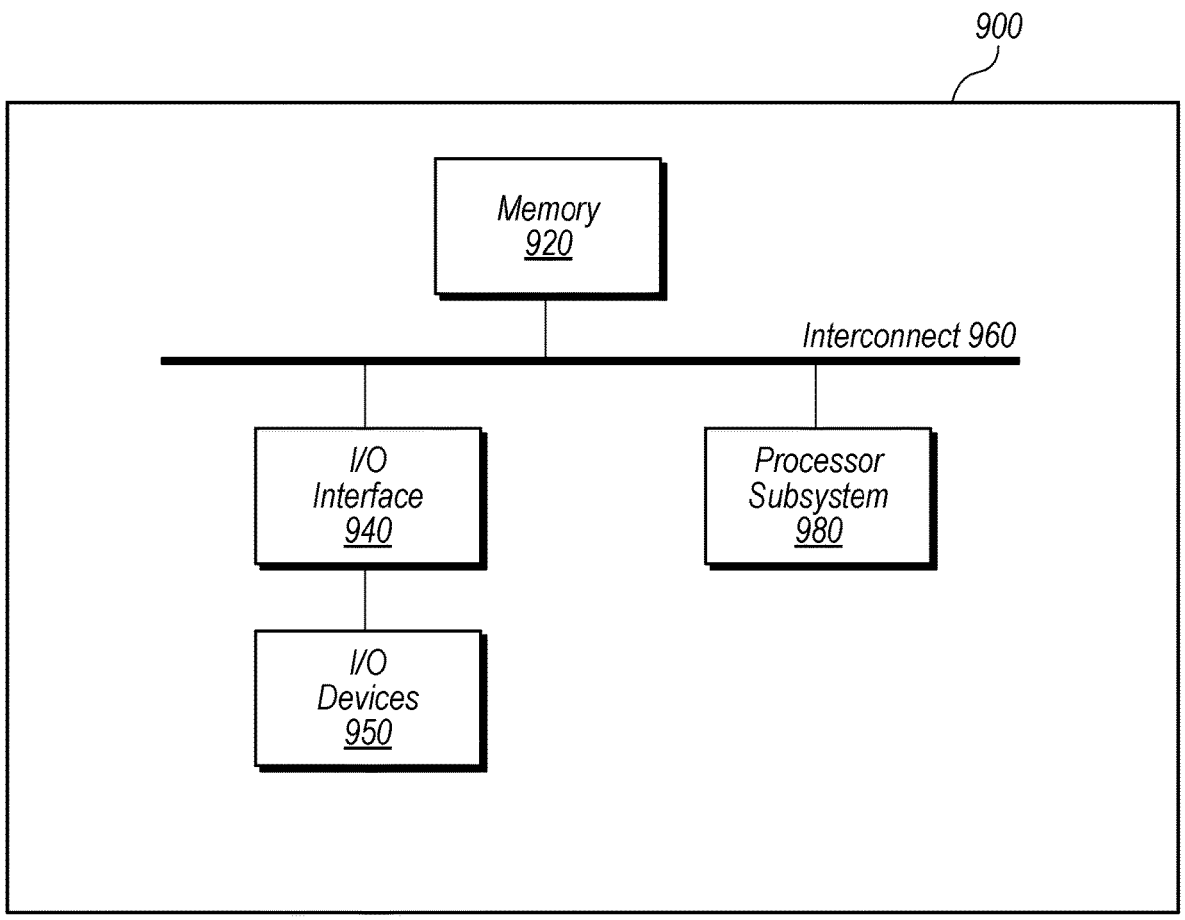
FIG. 9 is a block diagram illustrating elements of a computer system for implementing various systems described in the present disclosure, according to some embodiments.

Turning now to FIG. 9, a block diagram of an exemplary computer system 900, which may implement system 100, key-value database 110, server system 120, ID generator service 140, client system 150, MTS 800, and/or user systems 850 is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement ID generator service 140 and database service 130 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

operating, by a server system, a database, including receiving requests to access records of the database, wherein the requests specify synthetic identifiers (IDs) that are included in respective corresponding records currently stored in the database and are usable to access the respective corresponding records but do not include user-provided values of the records, and wherein the database is searchable using natural IDs that respectively comprise one or more values of a record that uniquely identify a corresponding record of the database;

receiving, by the server system, a request to insert a new record into the database;

in response to the request, obtaining, by the server system from a first instance of a plurality of identifier (ID) generator instances that implement a distributed ID generator service, a new synthetic ID for the new record, wherein the new synthetic ID is generated based on an identifier assigned to the first ID generator instance to ensure uniqueness of the new synthetic ID across the database;

inserting, by the server system, the new record into the database, wherein the new record includes the new synthetic ID and a natural ID that corresponds to one or more values of the new record; and causing, by the server system, an index of the database to be updated to store the new synthetic ID and the natural ID, wherein the index enables the new record to be accessed using the natural ID based on the new synthetic ID stored in the index.

2. The method of claim 1, wherein the new record is a child record that specifies a natural ID of a parent record, and wherein the method further comprises:
after inserting the child record, the server system:
accessing the parent record using the natural ID of the parent record specified by the child record; and
updating the child record to specify a synthetic ID of the parent record.

3. The method of claim 1, wherein the new record is a child record inserted before a corresponding parent record, and wherein the method further comprises:
after inserting the child record, the server system:
inserting the parent record into the database; and
updating the child record to specify a synthetic ID of the parent record.

4. The method of claim 1, wherein the record is a child record that specifies a natural ID of a parent record and a synthetic ID of the parent record, and wherein the method further comprises the server system:
deleting the parent record from the database;
reinserting the parent record into the database;
updating the child record to specify a null value for the synthetic ID of the parent record; and
after the updating, updating the child record to specify the synthetic ID of the parent record.

5. The method of claim 1, wherein the database is a non-relational database operated by a plurality of server systems, and wherein synthetic IDs generated by the distributed ID generator service are unique across the plurality of server systems.

6. The method of claim 1, wherein the obtaining of the new synthetic ID includes the server system:
providing, to the first ID generator instance, a record type and a tenant ID of a tenant associated with the new record, wherein the new synthetic ID is unique to records of the record type with respect to the tenant.

7. The method of claim 1, wherein the obtaining of the new synthetic ID includes the server system:
sending a synthetic ID request to the first ID generator instance to generate a batch of synthetic IDs having the new synthetic ID, wherein the server system is operable to insert a set of records using ones of the batch of synthetic IDs without issuing another synthetic ID request to the first ID generator instance.

8. The method of claim 1, further comprising:
deleting the new record from the database; and
reinserting the new record into the database, wherein the reinserted record includes the natural ID but a different synthetic ID.

9. The method of claim 1, wherein the new record is queryable using the new synthetic ID and the natural ID.

10. The method of claim 1, wherein the natural ID is specified by a provider of the request to insert the new record.

11. A non-transitory computer-readable medium having program instructions stored thereon that are capable of causing a computer system to perform operations comprising:
operating a database, including receiving requests to access records of the database, wherein the requests specify synthetic identifiers (IDs) that are included in respective corresponding records currently stored in the database and are usable to access the respective corresponding records but do not include user-provided values of the records, and wherein the database is searchable using natural IDs that respectively comprise one or more values of a record that uniquely identify a corresponding record of the database;
receiving a request to insert a new record into the database;
obtaining, from a first instance of a set of identifier (ID) generator instances that implement a distributed ID generator service, a new synthetic ID for the new record, wherein the new synthetic ID is generated based on an identifier assigned to the first ID generator instance to ensure uniqueness of the new synthetic ID across the database;
inserting the new record into the database, wherein the new record includes the new synthetic ID and a natural ID that corresponds to one or more values of the new record; and
causing an index of the database to be updated to store the new synthetic ID and the natural ID, wherein the index enables the new record to be accessed using the natural ID based on the new synthetic ID stored in the index.

12. The medium of claim 11, wherein the new record is a child record that specifies a natural ID of a parent record, and wherein the operations further comprise:
accessing the parent record using the natural ID of the parent record specified by the child record; and
updating the child record to specify a synthetic ID of the parent record to enable the child record to be accessed using the synthetic ID of the parent record.

13. The medium of claim 11, wherein the new record is a child record inserted before a corresponding parent record, and wherein the operations further comprise:
after inserting the parent record, updating the child record to specify a synthetic ID included in the parent record.

14. The medium of claim 11, wherein the new synthetic ID is obtained as a part of a batch of synthetic IDs provided by the first ID generator instance.

15. The medium of claim 11, wherein a portion of the new synthetic ID specifies the identifier assigned to the first ID generator instance.

16. A system, comprising:
at least one processor; and
memory having program instructions stored thereon that are executable by the at least one processor to cause the system to perform operations comprising:
operating a database, including receiving requests to access records of the database, wherein the requests specify synthetic identifiers (IDs) that are included in respective corresponding records currently stored in the database and are usable to access the respective corresponding records but do not include user-provided values of the record, and wherein the database is searchable using natural IDs that respectively comprise one or more values of a record that uniquely identify a corresponding record of the database;
receiving a request to insert a new record into the database;
obtaining, from a first instance of a set of identifier (ID) generator instances that implement a distributed ID generator service, a new synthetic ID for the new record, wherein the new synthetic ID is generated based on an identifier assigned to the first ID generator instance to ensure uniqueness of the new synthetic ID across the database;
inserting the new record into the database, wherein the new record includes the new synthetic ID and a natural ID that corresponds to one or more values of the new record; and causing an index of the database to be updated to store the new synthetic ID and the natural ID, wherein the index enables the new record to be accessed using the natural ID based on the new synthetic ID stored in the index.

17. The system of claim 16, wherein the new record does not yet include a reference field to a different record that has not been inserted in the database, and wherein the operations further comprise:
after inserting the different record, defining a reference field in the new record, wherein the reference field includes a synthetic ID of the different record.

18. The system of claim 16, wherein the obtaining of the new synthetic ID includes:
sending a synthetic ID request to the first ID generator instance to generate a batch of synthetic IDs having the new synthetic ID, wherein the operations further comprise inserting a different record in the database, and wherein the different record includes another one of the batch of synthetic IDs.

19. The system of claim 16, wherein the operations further comprise:
deleting the new record from the database; and
reinserting the new record into the database, wherein the reinserted record includes the natural ID but a different synthetic ID generated by a second instance of the set of ID generator instances.

20. The system of claim 16, wherein the request identifies the natural ID of the new record.

\* \* \* \* \*